United States Patent
Choi

(10) Patent No.: US 9,500,308 B2
(45) Date of Patent: Nov. 22, 2016

(54) SPIRAL-TYPE FLEXIBLE PIPE CONNECTOR

(75) Inventor: Jin Lim Choi, Sungnam-si (KR)

(73) Assignee: Dong-A Flexible Metal Tubes Co., Ltd., Seoul (KR)

(*) Notice: Subject to any disclaimer, the term of this patent is extended or adjusted under 35 U.S.C. 154(b) by 755 days.

(21) Appl. No.: 12/629,980

(22) Filed: Dec. 3, 2009

(65) Prior Publication Data

US 2011/0068571 A1 Mar. 24, 2011

(30) Foreign Application Priority Data

Sep. 21, 2009 (KR) .................. 10-2009-0089153

(51) Int. Cl.
*F16L 33/22* (2006.01)
*F16L 25/00* (2006.01)

(52) U.S. Cl.
CPC .......... *F16L 25/0036* (2013.01); *F16L 33/224* (2013.01)

(58) Field of Classification Search
CPC ............ F16L 25/0036; F16L 25/0045; F16L 25/0054; F16L 25/0063; F16L 33/224
USPC .................. 285/245, 246, 247, 248, 249
See application file for complete search history.

(56) References Cited

U.S. PATENT DOCUMENTS

| | | | | |
|---|---|---|---|---|
| 1,969,203 A * | 8/1934 | Cadden et al. | ............ | 285/222.2 |
| 2,321,260 A * | 6/1943 | Stecher | .................. | 285/249 |
| 3,006,664 A * | 10/1961 | Appleton et al. | ............. | 285/248 |
| 3,030,129 A * | 4/1962 | Appleton | .................. | 285/248 |
| 4,192,532 A * | 3/1980 | Pacella | .................. | 285/248 |
| 6,371,154 B1 * | 4/2002 | Kesterman et al. | ..... | 137/315.01 |
| 7,055,868 B2 * | 6/2006 | Watanabe | .................. | 285/249 |
| 7,108,294 B1 * | 9/2006 | Miller et al. | ............... | 285/286.1 |
| 7,914,048 B2 * | 3/2011 | Shemtov | .................. | 285/151.1 |
| 2007/0205601 A1 * | 9/2007 | Shemtov | .................. | 285/151.1 |

* cited by examiner

*Primary Examiner* — James Hewitt
(74) *Attorney, Agent, or Firm* — KED & Associates, LLP

(57) ABSTRACT

A spiral-type flexible pipe connector is provided that includes a socket, into which one end of a spiral-type flexible pipe is inserted, a nut coupled to the socket to fix the spiral-type flexible pipe to the socket, and a packing and a support ring located between the one end of the spiral-type flexible pipe and the socket. The packing includes a sealing portion, into which a tip of the one end of the spiral-type flexible pipe is inserted, such that the sealing portion surrounds the tip of the one end of the spiral-type flexible pipe, thereby sealing a connection part of the spiral-type flexible pipe.

13 Claims, 5 Drawing Sheets

SPIRAL-TYPE FLEXIBLE PIPE CONNECTOR

TECHNICAL FIELD

The present invention relates to a spiral-type flexible pipe connector, and more particularly to a spiral-type flexible pipe connector, which has an excellent sealing function in connection between a spiral-type flexible pipe and an object and prevents damage to a part, such as a packing, during a connection process.

BACKGROUND ART

In general, spiral-type flexible pipes are pipes designed to have a smaller fluid resistance than ring-type flexible pipes, to facilitate heat exchange between a fluid and the outside, and to be freely bent. In order to connect a spiral-type flexible pipe to another pipe, a heat storage tank, a boiler, etc., a connector using a screw-connection method, as an alternative to a welding method, is used. However, such a connector causes damage to parts, such as a packing, due to a difference of thermal expansion/contraction coefficients, thereby causing water leakage.

Further, a metal joining method (flat or joint method) without a packing (sealer) is used. However, this method requires an operation to flare a connection part at the tip of a pipe, which cannot be carried out in the field, and requires large tightening torque, thereby lowering operation efficiency.

DISCLOSURE

Technical Problem

Therefore, the present invention has been made in view of the above problems, and it is an object of the present invention to provide a spiral-type flexible pipe connector, which ensures sufficient watertightness even with a small coupling force.

Technical Solution

In accordance with an aspect of the present invention, the above and other objects can be accomplished by the provision of a spiral-type flexible pipe connector including a socket, into which one end of a spiral-type flexible pipe is inserted, a nut coupled to the socket to fix the spiral-type flexible pipe to the socket, and a packing located between the end of the spiral-type flexible pipe and the socket, wherein the packing includes a sealing part, into which the tip of the end of the spiral-type flexible pipe is inserted such that the sealing part surrounds the tip of the end of the spiral-type flexible pipe.

The spiral-type flexible pipe connector may further include a support ring connected to the spiral-type flexible pipe and located between the packing and the nut.

The packing may further include an extension part extended from the sealing part in a direction of the nut and adhered closely to the outer circumferential surface of the spiral-type flexible pipe.

A recess, into which the sealing part of the packing and the tip of the end of the spiral-type flexible pipe inserted into the sealing part are inserted, may be formed in the socket.

The sealing part may have a thickness to allow the sealing part to be inserted into the recess by an interference fit under the condition that the tip of the end of the spiral-type flexible pipe is inserted into the sealing part.

The recess may be formed by a projecting pipe part protruding from the inner circumferential surface of the socket toward the nut.

The sealing part may include an outer sealing part, from which the extension part is extended integrally, adhered closely to the outer circumferential surface of the tip of the end of the spiral-type flexible pipe, and an inner sealing part adhered closely to the inner circumferential surface of the tip of the end of the spiral-type flexible pipe.

The sealing part may be formed in a length corresponding to a depth of the recess.

The support ring may be screw-connected to the outer circumferential surface of the spiral-type flexible pipe.

A groove, into which the tip of the end of the spiral-type flexible pipe is inserted, may be formed in the sealing part.

The groove may be formed in a spiral type.

The packing may be made of an elastically deformable material.

The packing may be screw-connected to the spiral-type flexible pipe.

The outer surface of the socket may be inclined such that the outer diameter of the socket is gradually increased from an inner part thereof to a part thereof close to the nut.

The inner diameter of the socket may be gradually increased from an inner part thereof to a part thereof close to the nut.

The packing may be configured such that the outer diameter of the packing is gradually decreased in an inward direction of the socket.

Advantageous Effects

In a spiral-type flexible pipe connector in accordance with the present invention, a packing is screw-connected to the tip of one end of a spiral-type flexible pipe, i.e., a connection part of the spiral-type flexible pipe with an object, and then the tip of the end of the spiral-type flexible pipe is connected to a recess formed in a socket by an interference fit, thereby allowing the spiral-type flexible pipe connector to firstly obtain watertightness.

Further, in the spiral-type flexible pipe connector in accordance with the present invention, the packing includes an outer sealing part interposed between the inner circumferential surface of the socket and the outer circumferential surface of the spiral-type flexible pipe, and an inner sealing part extended and bent from the outer sealing part and interposed between the inner circumferential surface of the recess and the inner circumferential surface of the spiral-type flexible pipe, and thus has a double sealing effect using the outer sealing part and the inner sealing part, thereby allowing the spiral-type flexible pipe connector to secondarily obtain watertightness.

Further, in the spiral-type flexible pipe connector in accordance with the present invention, the packing is made of an easily elastically deformable material or graphite, and the packing is connected to the spiral-type flexible pipe by pressing force of the nut and support ring to fix the packing, thereby preventing a gap from occurring between the packing and the spiral-type flexible pipe upon occurrence of heat deformation of the spiral-type flexible pipe.

Moreover, the spiral-type flexible pipe connector in accordance with the present invention has the double sealing effect, as described above, and thus is capable of connecting a connection part of the spiral-type flexible pipe to another spiral-type flexible pipe or an object even with a small coupling force.

DESCRIPTION OF DRAWINGS

The above and other objects, features and other advantages of the present invention will be more clearly understood from the following detailed description taken in conjunction with the accompanying drawings, in which.

BEST MODE

Now, a preferred embodiment of the present invention will be described in detail with reference to the annexed drawings.

Figure 1:
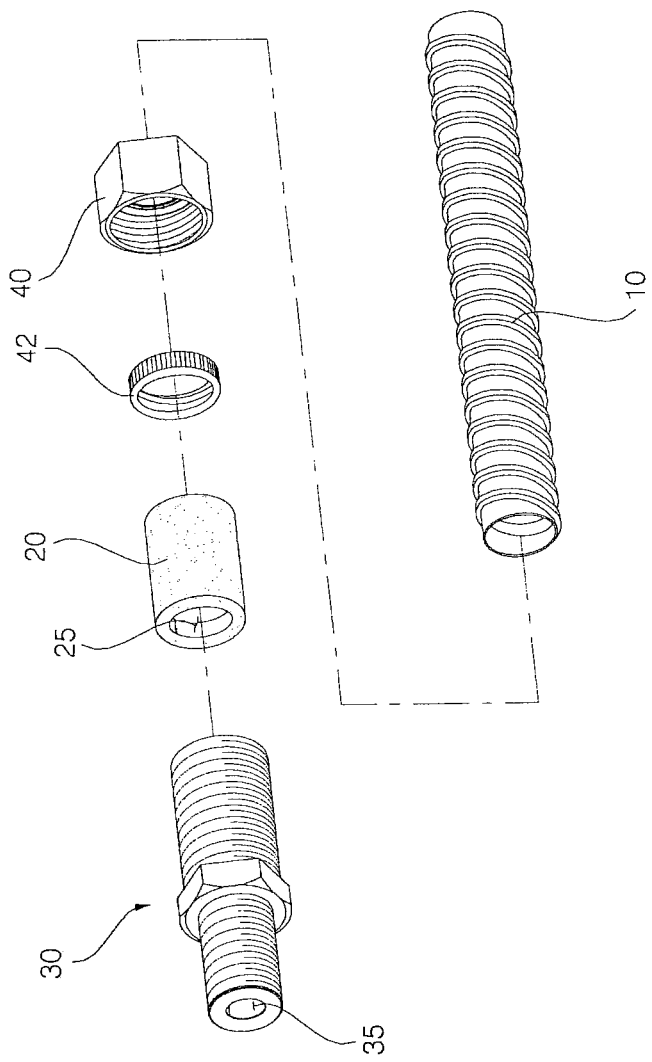
FIG. 1 is an exploded perspective view illustrating a spiral-type flexible pipe connector in accordance with one embodiment of the present invention.
Figure 2:
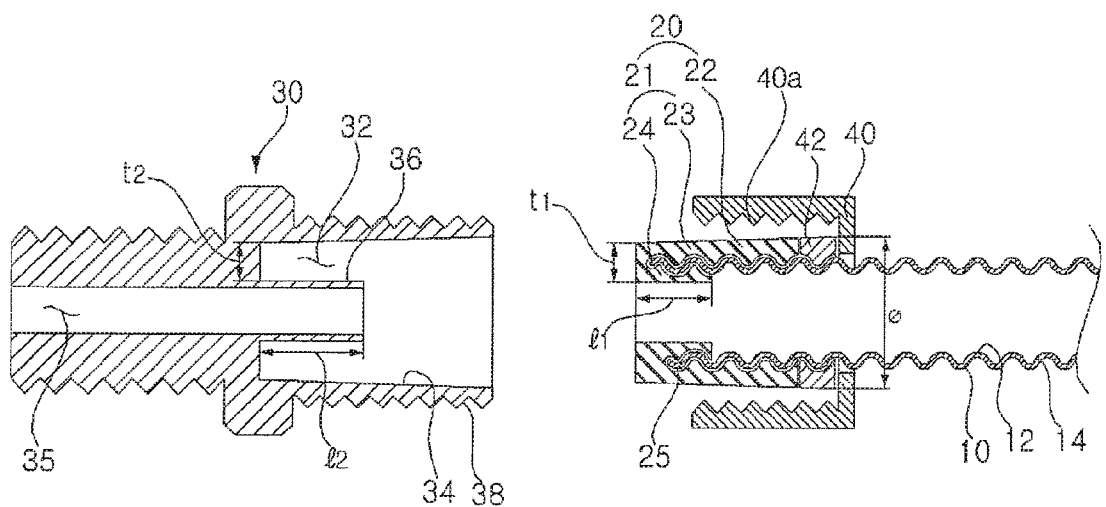
FIG. 2 is an exploded perspective view illustrating a packing of FIG. 1, which is fixed to a socket by a nut and is screw-connected to a spiral-type flexible pipe.
Figure 3:
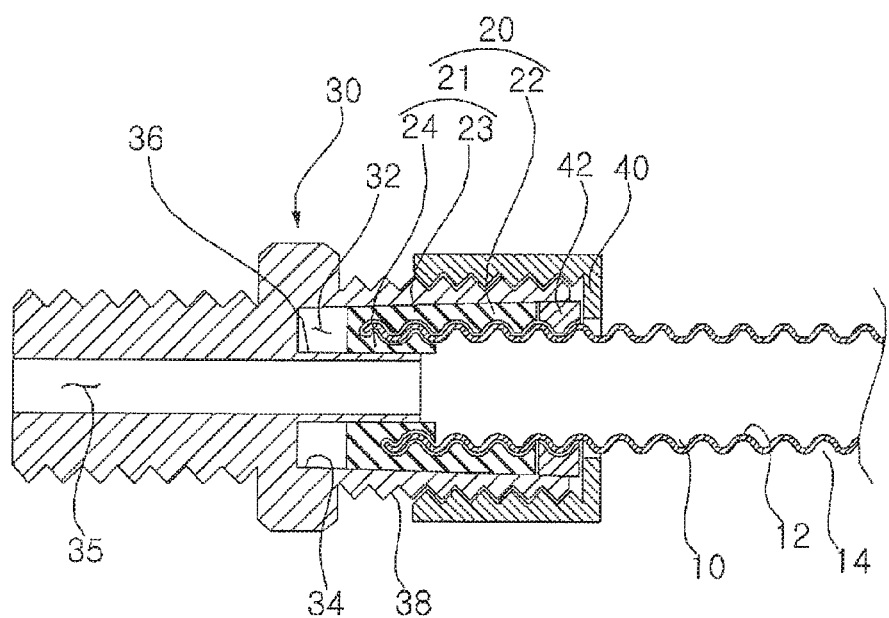
FIG. 3 is an assembled sectional view of FIG. 2.
Figure 4:
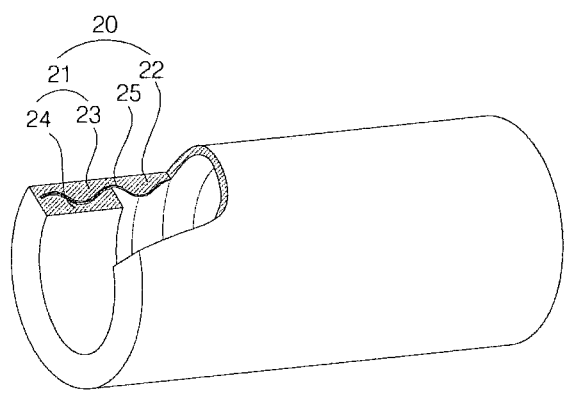
FIG. 4 is a partially-cut perspective view illustrating the packing of FIG. 1.
Figure 5:
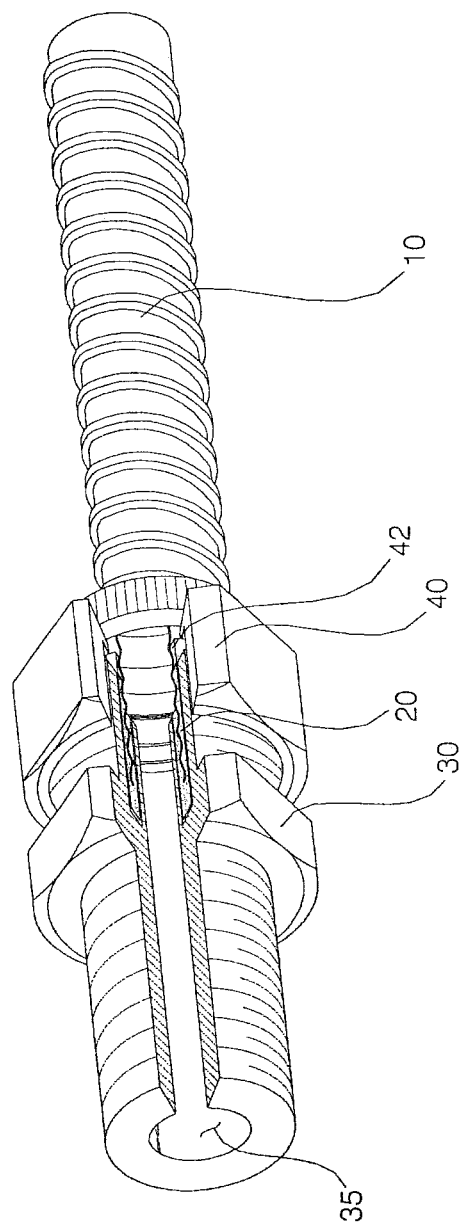
FIG. 5 is a partially-cut perspective view illustrating the spiral-type flexible pipe connector in accordance with the embodiment of the present invention.

FIG. 1 is an exploded perspective view illustrating a spiral-type flexible pipe connector in accordance with one embodiment of the present invention, FIG. 2 is an exploded perspective view illustrating a packing of FIG. 1, which is fixed to a socket by a nut and is screw-connected to a spiral-type flexible pipe, FIG. 3 is an assembled sectional view of FIG. 2, FIG. 4 is a partially-cut perspective view illustrating the packing of FIG. 1, and FIG. 5 is a partially-cut perspective view illustrating the spiral-type flexible pipe connector in accordance with the embodiment of the present invention.

The spiral-type flexible pipe connector in accordance with the embodiment of the present invention, as shown in FIG. 1, includes a socket 30, into which one end of a spiral-type flexible pipe 10 is inserted, and a packing 20 located between the end of the spiral-type flexible pipe 10 and the socket 30.

The packing 20 is interposed between the spiral-type flexible pipe 10 and a part required to connect the spiral-type flexible pipe 10 to another spiral-type flexible pipe 10 or an object, and thus achieves a sealing function to prevent leakage of a fluid flowing within the spiral-type flexible pipe 10. The packing 20 achieving such a sealing function may be made of a material that is easily elastically deformed. It is apparent that the easily elastically deformable material may employ a flexible material, such as rubber.

Preferably, the spiral-type flexible pipe 10 is made of a material having high heat conductivity such that a fluid flowing in the spiral-type flexible pipe 10 easily transfers heat to the outside.

The packing 20 to surround the end of the spiral-type flexible pipe 10 is screw-connected to the tip of the end of the spiral-type flexible pipe 10. For this purpose, a screw part (female screw part) corresponding to a screw part (male screw part) formed on an outer circumferential surface 14 of the spiral-type flexible pipe 10 is formed on the inner surface of the packing 20.

In more detail, as shown in FIG. 4, the packing 20 is formed in a cylindrical shape corresponding to the spiral-type flexible pipe 10 such that the tip of the end of the spiral-type flexible pipe 10 is inserted into the packing 20.

Further, the packing 20 may have a tapered cross section in which the outer diameter of the packing 20 is decreased from a part thereof distant from the end of the spiral-type flexible pipe 10 to a part thereof close to the end of the spiral-type flexible pipe 10.

Concretely, the packing 20 includes a sealing part 21 provided with an inner end, into which the tip of the end of the spiral-type flexible pipe 10 is inserted under the condition that the tip of the end of the spiral-type flexible pipe 10 is surrounded by the sealing part 21, and an extension part 22 extended from the sealing part 21 and adhered closely to the outer circumferential surface 14 of the spiral-type flexible pipe 10 when the end of the spiral-type flexible pipe 10 is inserted into the sealing part 21.

Here, the sealing part 21 includes an outer sealing part 23, to which the outer circumferential surface 14 of the spiral-type flexible pipe 10 is closely adhered, and an inner sealing part 24, to which an inner circumferential surface 12 of the spiral-type flexible pipe 10 is closely adhered, connected with the outer sealing part 23 at the tip thereof.

The outer sealing part 23 and the extension part 22 are integrally connected to each other such that the outer sealing part 23 and the extension part 22 are adhered closely to the outer circumferential surface 14 of the spiral-type flexible pipe 10.

The sealing part 21 including the outer sealing part 23 and the inner sealing part 24 has an approximately C-shaped cross section, as shown in FIG. 4, and a thin groove 25 is formed between the outer sealing part 23 and the inner sealing part 24.

The groove 25 may be a spiral-type groove, to which the tip of the end of the spiral-type flexible pipe 10 is screw-connected.

The sealing part 21, into which the tip of the end of the spiral-type flexible pipe 10 is inserted, has a thickness t1, as shown in FIG. 2.

The end of the spiral-type flexible pipe 10, under the condition that the tip of the end of the spiral-type flexible pipe 10 is inserted into the sealing part 21, is connected with the socket 30.

A passage hole 35 to pass the fluid is formed in the socket 30, and a recess 32, into which the tip of the end of the spiral-type flexible pipe 10 and the sealing part 21 connected with the tip of the end of the spiral-type flexible pipe 10 are inserted, is formed at the inside of the socket 30 corresponding to the passage hole 35, as shown in FIGS. 2 and 5.

The recess 32, as shown in FIGS. 2 and 3, is formed by a projecting pipe part 36 protruding from the inner circumferential surface of the socket 30 toward a nut 40, which will be described later.

Here, it is preferable that the recess 32 have a width t2 (in FIG. 2) such that the sealing part 21, into which the tip of the end of the spiral-type flexible pipe 10 is inserted, may be inserted into the recess 32 by an interference fit. That is, since the width t2 of the recess 32 in FIG. 2 is slightly smaller than the thickness t1 of the sealing part 21 in FIG. 2, the tip of the end of the spiral-type flexible pipe 10 inserted into the sealing part 21 is inserted into the recess 32 by the interference fit.

As such, if the sealing part 21 is inserted into the recess 32 by the interference fit, although the spiral-type flexible pipe 10 is not fixed to the socket 30 by the nut 40, which will be described later, the spiral-type flexible pipe 10 is temporarily fixed, thus facilitating a subsequent connection process.

Further, when the sealing part 21 is inserted into the recess 32, the sealing part 21 is more closely adhered to the inner circumferential surface 36 and an outer circumferential surface (i.e., an inner circumferential surface of the socket 30) 34 of the recess 32, thus improving watertightness.

Moreover, the packing 20 is made of an easily elastically deformable material, as described above, or slippery graphite, and thus it is obvious that the sealing part 21 is easily inserted into the recess 32 by the interference fit.

In order to easily insert the end of the spiral-type flexible pipe 10, to which the tapered packing 20 is connected, into the recess 32, the recess 32 is formed in a tapered shape in which the outer diameter of the recess 32 is gradually increased from an inner part thereof to an outer part (right part in the drawings) thereof.

Here, since the packing 20 is made of an easily elastically deformable material, such as rubber, the packing 20 is easily inserted into the recess 32 and is not easily separated from the recess 32 even by small external force after the insertion into the recess 32, and thus temporary fixation of the spiral-type flexible pipe 10 to the socket 30 is excellent.

Further, the sealing part 21 may have a length 11 corresponding to a depth 12 of the recess 32.

The spiral-type flexible pipe connector in accordance with the embodiment of the present invention further includes a support ring 42 to fix the spiral-type flexible pipe 10 temporarily connected to the recess 32, as shown in FIGS. 1 to 3 and FIG. 5.

The support ring 42 is connected to the spiral-type flexible pipe 10 under the condition that the support ring 42 is not exposed to the outside by the socket 30 and the nut 40, which will be described later, and serves to support the packing 20.

The spiral-type flexible pipe connector in accordance with the embodiment of the present invention further includes the nut 40 connected to an outer circumferential surface 38 of the socket 30 to shield the support ring 42 from the outside and to press the support ring 42.

Here, the support ring 42 serves to support the packing 20 without movement before the spiral-type flexible pipe 10 and the socket 30 are finally connected by the nut 40.

Particularly, a female screw part corresponding to the male screw part formed on the outer circumferential surface 14 of the spiral-type flexible pipe 10 is formed on the inner surface of the support ring 42 so as to connect the inner surface of the support ring 42 to the outer circumferential surface 14 of the spiral-type flexible pipe 10.

The support ring 42 need not have an excessively long length, and may have a length that is sufficient to form the female screw part of at least one pitch on the inner surface thereof.

Since the support ring 32 is screw-connected to the outer circumferential surface 14 of the spiral-type flexible pipe in this way, the tip of the end of the spiral-type flexible pipe 10, to which the packing 20 is connected, is inserted into the recess 32, and then the support ring 42 is rotated toward the end of the spiral-type flexible pipe, to which the packing 20 is connected, thereby supporting/fixing (double-nutting) the packing 20

Here, the support ring 42 has an outer diameter Φ that is sufficient to allow the support ring 42 connected to the spiral-type flexible pipe 10 to be interposed between the outer circumferential surface 14 of the spiral-type flexible pipe 10 and the inner circumferential surface 34 of the socket 30.

By interposing the support ring 42 between the outer circumferential surface 14 of the spiral-type flexible pipe 10 and the inner circumferential surface 34 of the socket 30, the packing 20 is connected to the recess 32 with stronger pressing force.

A male screw part is formed on the outer circumferential surface 38 of the socket 30 and a female screw part corresponding to the male screw part of the socket 30 is formed on the inner circumferential surface of the nut 40, and thus the nut 40 is screw-connected to the outer circumferential surface 38 of the socket 30.

As shown in FIG. 2, the socket 30 is configured such that the diameter of the outer circumferential surface 38 of the socket 30 is gradually increased toward a front end part thereof, to which the nut 40 is initially screw-connected. On the other hand, the nut 40 is configured such that the diameter of the inner circumferential surface 40a of the nut 40 is gradually decreased from a part thereof initially connected to the outer circumferential surface of the socket 30 to a part thereof distant from the socket 30.

When the nut 40 is screw-connected to the outer circumferential surface 38 of the socket 30, the diameter of the front end of the socket 30 is gradually reduced by the pressing force or coupling force of the nut 40, and thus the socket 30 presses the packing 20 inserted thereinto. Such pressing force of the packing 20 further improves a function of sealing a connection part of the spiral-type flexible pipe 10.

Particularly, as the nut 40 is screw-connected to the socket 30, the nut 40 presses the support ring 42, already connected to the spiral-type flexible support 10, in a direction of the recess 32, and thus presses the packing 20 in the direction of the recess 32 as well as in the central direction of the socket 30, thereby ensuring greater watertightness.

The spiral-type flexible pipe connector in accordance with the embodiment of the present invention employs an indirect contact coupling method in which the packing 20 including the sealing part 21 is interposed between the recess 32 formed in the socket 30 and the spiral-type flexible pipe 10, other than a direct contact coupling method in which the spiral-type flexible pipe 10 directly contacts the recess 32 formed in the socket 30, and further presses the packing 20 using the nut 40 and the support ring 42 so as to finally connect the spiral-type flexible pipe 10 to the socket 30, thereby further improving watertightness of a product and facilitating a coupling process.

Hereinafter, a process of coupling the spiral-type flexible pipe connector in accordance with the embodiment of the present invention will be described with reference to the accompanying drawings.

First, as shown in FIG. 1, the nut 40 is first inserted into the outer circumferential surface 14 of the spiral-type flexible pipe 10, and then the support ring 42 is screw-connected to the outer circumferential surface 14 of the spiral-type flexible pipe 10.

Thereafter, the packing 20 is screw-connected to the tip of one end of the spiral-type flexible pipe 10 by rotation.

Therefore, the tip of the end of the spiral-type flexible pipe 10, to which the packing 20 is screw-connected, is moved in a direction of the recess 32 of the socket 30, and then the sealing part 21 is connected to the recess 32 by an interference fit.

After the above temporary fixation of the spiral-type flexible pipe 10, to which the packing 20 is screw-connected, to the recess 32, the support ring 42 is rotated to firmly support/fix (double-nut) the packing 20, and then is rotated to be interposed between the outer circumferential surface 14 of the spiral-type flexible pipe 10 and the inner circumferential surface 34 of the socket 30.

Finally, the nut 40 is screw-connected to the socket 30. Thereby, the coupling process of the spiral-type flexible pipe connector in accordance with the embodiment of the present invention is completed.

MODE FOR INVENTION

Various embodiments have been described in the best mode for carrying out the invention.

INDUSTRIAL APPLICABILITY

As apparent from the above description, the present invention provides a spiral-type flexible pipe connector, in which a packing is screw-connected to the tip of one end of a spiral-type flexible pipe, i.e., a connection part of the spiral-type flexible pipe with an object, and then the tip of the end of the spiral-type flexible pipe is connected to a recess formed in a socket by an interference fit, thereby firstly obtaining watertightness.

Further, in the spiral-type flexible pipe connector in accordance with the present invention, the packing includes an outer sealing part interposed between the inner circumferential surface of the socket and the outer circumferential surface of the spiral-type flexible pipe, and an inner sealing part extended and bent from the outer sealing part and interposed between the inner circumferential surface of the recess and the inner circumferential surface of the spiral-type flexible pipe, and thus has a double sealing effect using the outer sealing part and the inner sealing part, thereby allowing the spiral-type flexible pipe connector to secondarily obtain watertightness.

Further, in the spiral-type flexible pipe connector in accordance with the present invention, the packing is made of an easily elastically deformable material or graphite, and the packing is connected to the spiral-type flexible pipe by pressing force of the nut and support ring to fix the packing, thereby preventing a gap from occurring between the packing and the spiral-type flexible pipe upon occurrence of heat deformation of the spiral-type flexible pipe.

Moreover, the spiral-type flexible pipe connector in accordance with the present invention has the double sealing effect, as described above, and thus is capable of connecting a connection part of the spiral-type flexible pipe to another spiral-type flexible pipe or an object even with a small coupling force.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A spiral-type flexible pipe connector, comprising:
a socket, into which one end of a spiral-type flexible pipe is inserted;
a nut configured to be screw-connected to the socket to fix the spiral-type flexible pipe to the socket; and
a packing located between the one end of the spiral-type flexible pipe and the socket, wherein the packing includes a sealing portion, into which a tip of the one end of the spiral-type flexible pipe is inserted such that the sealing portion surrounds the tip of the one end of the spiral-type flexible pipe, wherein the socket includes a recess, into which the sealing portion of the packing surrounding the tip of the one end of the spiral-type flexible pipe is inserted such that the sealing portion is in close contact with an inner circumferential surface and an outer circumferential surface of the recess, wherein a diameter of the inner circumferential surface of the recess is substantially the same as or larger than a diameter of an inner circumferential surface of the sealing portion and a diameter of the outer circumferential surface of the recess is substantially the same as or less than a diameter of an outer circumferential surface of the sealing portion to provide the close contact by an interference fit, wherein the diameter of the outer circumferential surface of the recess gradually increases along a length thereof as it extends from an inner portion thereof toward the nut, wherein the diameter of the outer circumferential surface of the sealing portion gradually decreases along a length thereof in a direction toward the socket, wherein the packing further includes an extension portion that extends from the sealing portion in a direction of the nut and is adhered closely to an outer circumferential surface of the spiral-type flexible pipe, and wherein the sealing portion of the packing includes:
an outer sealing portion, from which the extension portion integrally extends, adhered closely to an outer circumferential surface of the tip of the one end of the spiral-type flexible pipe; and
an inner sealing part adhered closely to an inner circumferential surface of the tip of the one end of the spiral-type flexible pipe.

2. The spiral-type flexible pipe connector according to claim 1, further comprising a support ring connected to the spiral-type flexible pipe and located between the packing and the nut.

3. The spiral-type flexible pipe connector according to claim 1, wherein the recess is formed by a projecting pipe portion that protrudes from the socket toward the nut.

4. The spiral-type flexible pipe connector according to claim 3, wherein the socket includes a passage hole that communicates with a corresponding passage hole formed in the packing.

5. The spiral-type flexible pipe connector according to claim 4, wherein the passage hole of the socket extends through the projecting pipe portion.

6. The spiral-type flexible pipe connector according to claim 5, wherein the passage hole formed in the packing is configured to receive an end of the projecting pipe portion inserted therein.

7. The spiral-type flexible pipe connector according to claim 1, wherein a length of the sealing portion of the packing corresponds to a depth of the recess.

8. The spiral-type flexible pipe connector according to claim 1, wherein a groove, into which the tip of the one end of the spiral-type flexible pipe is inserted, is formed in the sealing portion.

9. The spiral-type flexible pipe connector according to claim 1, wherein the packing is made of an elastically deformable material.

10. The spiral-type flexible pipe connector according to claim 1, wherein the packing is screw-connected to the spiral-type flexible pipe.

11. The spiral-type flexible pipe connector according to claim 1, wherein a diameter of an outer circumferential surface of the socket gradually increases as it extends from a portion thereof adjacent an end of the recess into which the sealing portion is received toward the nut and a diameter of an inner circumferential surface of the nut gradually decreases as it extends away from the socket such that the socket presses the packing inserted thereinto toward the flexible pipe when the nut is screw-connected to the socket.

12. A spiral-type flexible pipe connector, comprising:
a socket, into which one end of a spiral-type flexible pipe is inserted;
a nut configured to be screw-connected to the socket to fix the spiral-type flexible pipe to the socket;
a packing located between the one end of the spiral-type flexible pipe and the socket, wherein the packing includes a sealing portion, into which a tip of the one end of the spiral-type flexible pipe is inserted such that the sealing portion surrounds the tip of the one end of the spiral-type flexible pipe, wherein the socket includes a recess, into which the sealing portion of the packing surrounding the tip of the one end of the spiral-type flexible pipe is inserted such that the sealing portion is in close contact with an inner circumferential surface and an outer circumferential surface of the recess, wherein a diameter of the inner circumferential surface of the recess is substantially the same as or larger than a diameter of an inner circumferential surface of the sealing portion and a diameter of the outer circumferential surface of the recess is substantially the same as or less than a diameter of an outer circumferential surface of the sealing portion to provide the close contact by an interference fit, wherein the diameter of the outer circumferential surface of the recess gradually increases along a length thereof as it extends from an inner portion thereof toward the nut, wherein the diameter of the outer circumferential surface of the sealing portion gradually decreases along a length thereof in a direction toward the socket; and
a support ring connected to the spiral-type flexible pipe and located between the packing and the nut, wherein the support ring is screw-connected to an outer circumferential surface of the spiral-type flexible pipe.

13. A spiral-type flexible pipe connector, comprising:
a socket, into which one end of a spiral-type flexible pine is inserted;
a nut configured to be screw-connected to the socket to fix the spiral-type flexible pipe to the socket; and
a packing located between the one end of the spiral-type flexible pipe and the socket, wherein the packing includes a sealing portion, into which a tip of the one end of the spiral-type flexible pipe is inserted such that the sealing portion surrounds the tip of the one end of the spiral-type flexible pipe, wherein the socket includes a recess, into which the sealing portion of the packing surrounding the tip of the one end of the spiral-type flexible pipe is inserted such that the sealing portion is in close contact with an inner circumferential surface and an outer circumferential surface of the recess, wherein a diameter of the inner circumferential surface of the recess is substantially the same as or larger than a diameter of an inner circumferential surface of the sealing portion and a diameter of the outer circumferential surface of the recess is substantially the same as or less than a diameter of an outer circumferential surface of the sealing portion to provide the close contact by an interference fit, wherein the diameter of the outer circumferential surface of the recess gradually increases along a length thereof as it extends from an inner portion thereof toward the nut, wherein the diameter of the outer circumferential surface of the sealing portion gradually decreases along a length thereof in a direction toward the socket, wherein a groove, into which the tip of the one end of the spiral-type flexible pipe is inserted, is formed in the sealing portion, wherein the groove is formed in a spiral shape.

* * * * *